(12) United States Patent
Danzinger et al.

(10) Patent No.: US 9,250,728 B2
(45) Date of Patent: Feb. 2, 2016

(54) APPARATUS AND METHOD PERTAINING TO PREDICTED-TEXT ENTRY

(71) Applicant: Research In Motion Limited, Waterloo (CA)

(72) Inventors: Wilfried Richard Alexander Danzinger, Waterloo (CA); Gerry Pieter Moerkerken, Scotland (CA)

(73) Assignee: BlackBerry Limited, Waterloo, Ontario (CA)

( * ) Notice: Subject to any disclaimer, the term of this patent is extended or adjusted under 35 U.S.C. 154(b) by 311 days.

(21) Appl. No.: 13/753,033

(22) Filed: Jan. 29, 2013

(65) Prior Publication Data
US 2014/0215396 A1     Jul. 31, 2014

(51) Int. Cl.
*G06F 3/041* (2006.01)
*G06F 3/023* (2006.01)

(52) U.S. Cl.
CPC .............. *G06F 3/041* (2013.01); *G06F 3/0236* (2013.01); *G06F 3/0237* (2013.01)

(58) Field of Classification Search
CPC ... G06F 3/041; G06F 3/04895; G06F 3/0238; G06F 3/0237
See application file for complete search history.

(56) References Cited

U.S. PATENT DOCUMENTS

| | | | |
|---|---|---|---|
| 5,347,295 A * | 9/1994 | Agulnick et al. | 345/156 |
| 5,896,321 A | 4/1999 | Miller et al. | |
| 5,943,655 A | 8/1999 | Jacobson | |
| 5,970,455 A * | 10/1999 | Wilcox et al. | 704/270 |
| 6,286,064 B1 * | 9/2001 | King et al. | 710/67 |
| 6,377,965 B1 | 4/2002 | Hachamovitch et al. | |
| 7,162,694 B2 | 1/2007 | Venolia | |
| 2004/0201607 A1 | 10/2004 | Mulvey et al. | |
| 2007/0205983 A1 | 9/2007 | Naimo | |
| 2008/0217075 A1 | 9/2008 | Gordner et al. | |
| 2009/0102685 A1 | 4/2009 | Lassesson et al. | |
| 2009/0193334 A1 | 7/2009 | Assadollahi | |
| 2011/0201387 A1 * | 8/2011 | Paek et al. | 455/566 |
| 2011/0260982 A1 | 10/2011 | Trout | |
| 2012/0174035 A1 * | 7/2012 | Baker et al. | 715/835 |

(Continued)

FOREIGN PATENT DOCUMENTS

| WO | 94/19736 A1 | 9/1994 |
|---|---|---|
| WO | 2006/080858 A1 | 8/2006 |

(Continued)

OTHER PUBLICATIONS

Blackbery Bold 9900 product spec from http://us.blackberry.com/smartphones/blackberry-bold-9900-9930.html#/h:/smartphones/blackberry-bold-9900-9930/phone-specifications.html; Jan. 2013; 2 pages.

Extended European Search Report from related European Patent Application No. 13153153.5 dated May 14, 2013; 6 pages.

*Primary Examiner* — Jennifer To
*Assistant Examiner* — Li Sun
(74) *Attorney, Agent, or Firm* — Jon Gibbons; Fleit Gibbons Gutman Bongini & Bianco P.L.

(57) ABSTRACT

A method includes displaying, via a touch-sensitive display, a plurality of predicted entries as a function, at least in part, of at least some characters entered via a non-virtual alphanumeric keyboard. A first touch is detected with the touch-sensitive display. The first touch is used to identify a first one of the predicted entries. The first one of the predicted entries is selected.

14 Claims, 5 Drawing Sheets

(56) References Cited

U.S. PATENT DOCUMENTS

2012/0206367 A1    8/2012    Griffin et al.
2012/0304074 A1*   11/2012   Ooi et al. ...................... 715/752
2013/0002556 A1    1/2013    Griffin

FOREIGN PATENT DOCUMENTS

WO    2011082101 A2    7/2011
WO    2013002779 A1    1/2013

* cited by examiner

APPARATUS AND METHOD PERTAINING TO PREDICTED-TEXT ENTRY

FIELD OF TECHNOLOGY

The present disclosure relates to electronic devices, including but not limited to, portable electronic devices having touch-sensitive displays and their control. More particularly the present disclosure relates to the presentation and use of predicted text entries.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified based on the functions and operations being performed. With continued demand for decreased size of portable electronic devices, touch-sensitive displays continue to decrease in size.

DETAILED DESCRIPTION

The following describes an apparatus for and method of displaying (via, for example, a touch-sensitive display) a plurality of predicted entries as a function, at least in part, of at least some characters entered via a non-virtual alphanumeric keyboard and detecting and using a particular touch (for example, of the touch-sensitive display) to identify and select a particular one of the predicted entries. By one approach the predicted entries are displayed along a side of a touch-sensitive display that is most near to a non-virtual alphanumeric keyboard.

These teachings are highly flexible in practice and will accommodate a wide variety of alterations, embellishments, and combinations. For example, by one approach, the aforementioned plurality of predicted entries can be presently immediately selectable via a detected touch (by, for example, the touch-sensitive display). In such a case, at least a second group of predicted entries that are not presently immediately selectable via a detected touch can also be simultaneously displayed along with that group of selectable predicted entries. Also in such a case, and if desired, upon detecting another touch the selectability of these groups of predicted entries can be switched to thereby permit the user to quickly select any of that second group of predicted entries using a corresponding touch.

As another example with respect to the flexibility of these teachings, in combination with the foregoing or in lieu thereof these teachings will accommodate responding to another detected touch by displaying a different plurality of predicted entries altogether and/or undoing a previous predicted entry action.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly-enabled notebook computers, tablet computers, mobile internet devices, electronic navigation devices, and so forth. The electronic device may also be a portable electronic device lacking wireless communication capabilities, such as a handheld electronic game, digital photograph album, digital camera, media player, e-book reader, and so forth.

Figure 1:
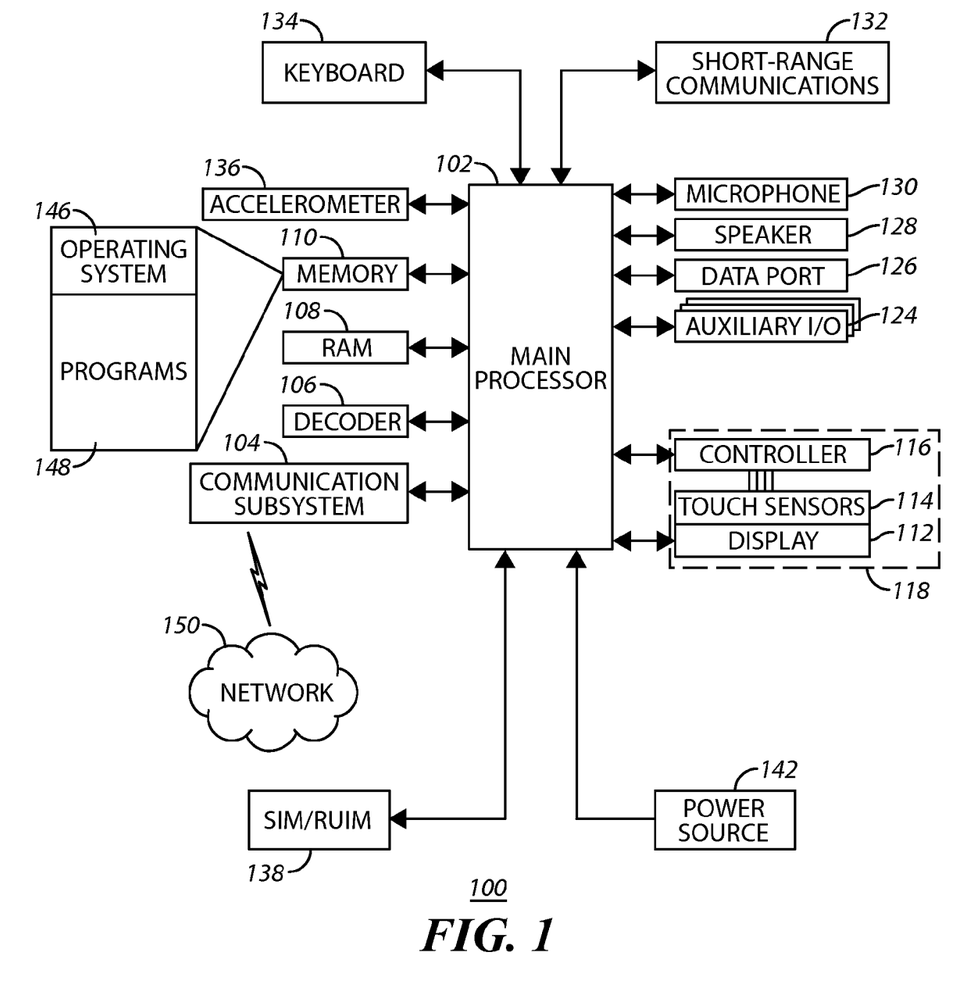
FIG. 1 is a block diagram of a portable electronic device in accordance with the disclosure.

A block diagram of an example of a portable electronic device 100 is shown in FIG. 1. The portable electronic device 100 includes multiple components including a processor 102, which may comprise discrete components, one or more microprocessors or other types of processors, and so forth, that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, an auxiliary input/output (I/O) subsystem 124, a data port 126, a speaker 128, a microphone 130, short-range communications 132, and, pursuant to some optional approaches, a non-virtual keyboard 134. As used herein this reference to a "non-virtual keyboard" will be understood to refer to a keyboard other than a keyboard that is presented on a touch-sensitive display. Accordingly, a non-virtual keyboard includes key assemblies that each include at least one moving mechanical component. This keyboard can comprise, by one approach, an alphanumeric keyboard with keys corresponding to one or more alphabetic and/or numeric characters (which may include any of a variety of alphabetic, logographic, and/or syllabic characters and/or numeric characters).

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus (active or passive), pen, or other pointer, based on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time. A gesture may also comprise a plurality of simultaneous or at least overlapping (in time) sub-gestures (such as a drawing together or spreading apart of two individual concluding ends).

Numerous electronic devices offer the user an ability to enter alphanumeric text on a character-by-character basis. User-input interfaces in these regards include but are not limited to physical keyboards as well as virtual keyboards (i.e., keyboards that are displayed on a touch-sensitive display that offers keys that a user can individually select by tapping the display at the location of the desired key). Full-size keyboards can accommodate relatively high-speed text input with reasonably proficient typists typically achieving input rates of dozens of words per minute.

Smaller keyboards (such as those often found on so-called smartphones, pad/tablet-styled devices, and so forth), however, will typically not accommodate ordinary typing practices and often require the user to instead employ either a hunt-and-peck style of typing or so-called thumb typing. Accordingly, the rate at which a typical typist can enter text using a smaller keyboard is usually considerably lower than the ordinary rates that are associated with full-size mechanical keyboards.

Some electronic devices attempt to shorten the number of characters that a user must enter by offering the user predicted text candidates. For example, if the user types the letter "t," the device may simultaneously display a listing of possible words that the user might be intending to type, such as the words "there," "the," "that," and "those." When the device successfully displays the intended word, the user can select that word (for example, by tapping the proffered word on a touchscreen display). Upon selecting the word, the selected word is added to the user's previously entered text and the user can continue entering characters to complete their message.

While useful to a degree, prior-art approaches in these regards are not necessarily well suited to all application settings. Electronic devices that employ a physical keyboard, for example, are not always able to usefully employ these prior-art approaches to good effect. Similarly, devices that offer only a relatively small display are also often unduly hampered in these regards.

By one approach the present teachings can pertain to text-entry predictions. In particular, as a user enters characters (such as but not limited to alphabetic characters) via a keyboard various predicted entries are displayed. By selecting a predicted entry for use in the development of a complete message the user can at least sometimes avoid needing to enter all of the individual characters that constitute the selected predicted entry. Various prediction approaches are known in these regards. As the present teachings are not overly sensitive to any particular choices in these regards, further elaboration regarding any particular prediction methodology is not provided here for the sake of brevity.

Figure 2:
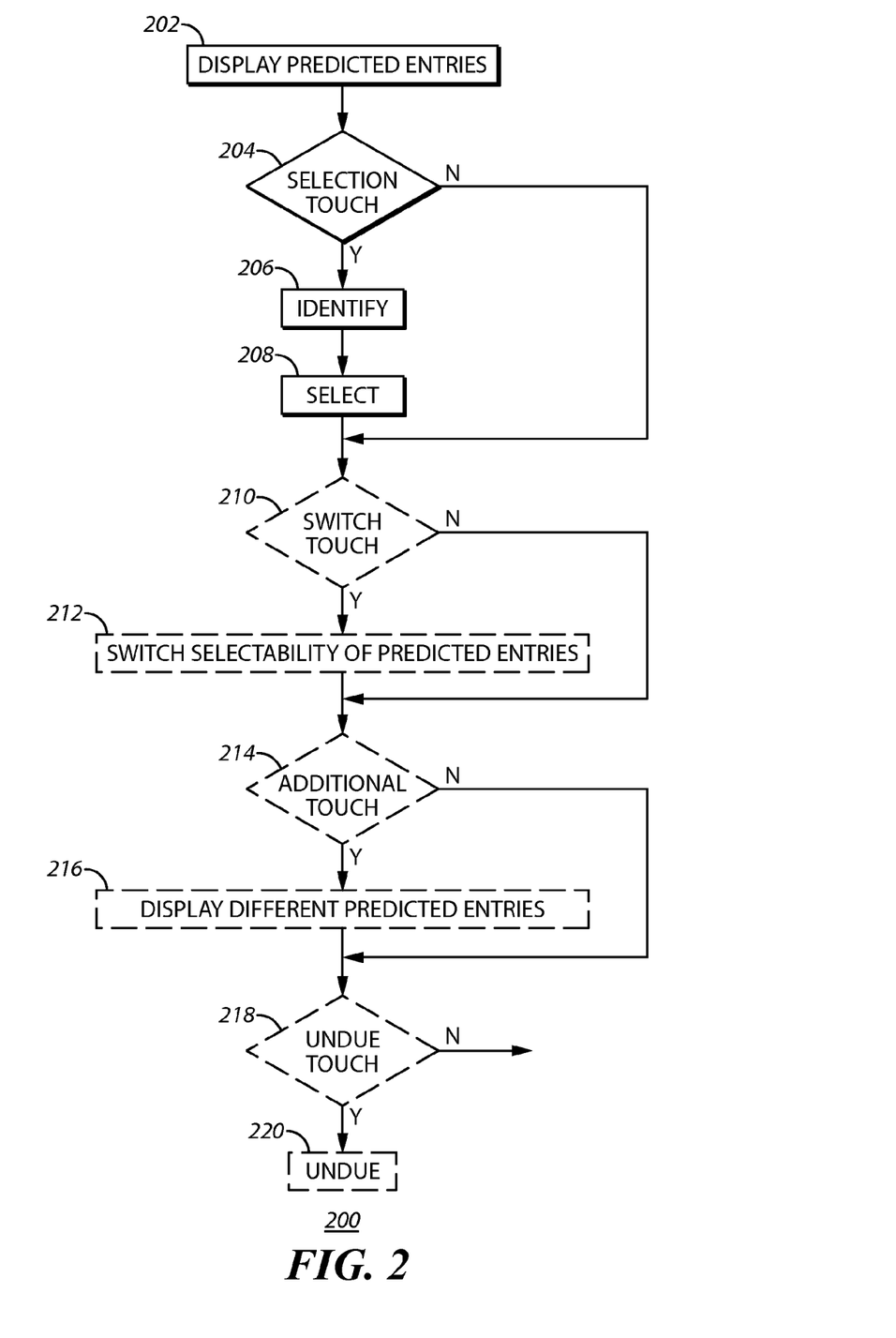
FIG. 2 is a flowchart in accordance with the disclosure.

A first flowchart 200 illustrating a variety of approaches in these regards is shown in FIG. 2. The method may be carried out by software executed, for example, by the aforementioned processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, device, or apparatus, which may be a non-transitory or tangible storage medium such as the memory 110 described above.

Figure 3:
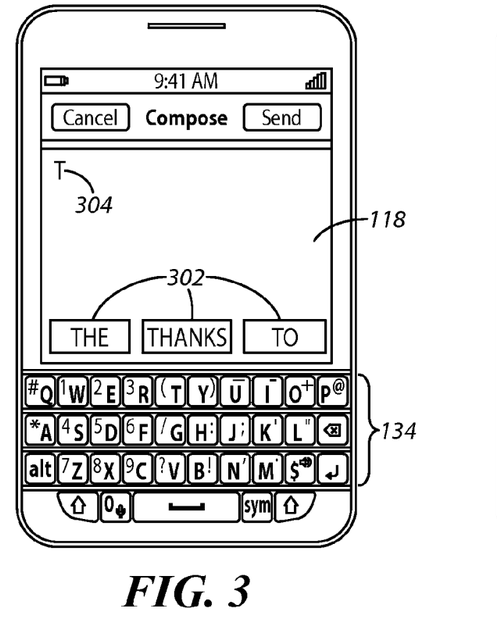
FIG. 3 is a schematic screen shot in accordance with the disclosure.

For the sake of an initial illustrative example it will be presumed here that the displayed information described in this flowchart 200 appears on the aforementioned touch-sensitive display 118 and that the described entries are input via a non-virtual alphanumeric keyboard 134 as described above. It will further be presumed (again for the sake of an example) that the touch-sensitive display 118 and the non-virtual alphanumeric keyboard 134 are nonmovably disposed in close proximity to one another and without another active user interface element being externally disposed therebetween. FIG. 3 presents an illustrative example in these regards. (Those skilled in the art will understand and appreciate that the described flowchart 200 can be carried out using other enabling platforms and can in particular be carried out using a touch-sensitive display 118 that offers a virtual keyboard as versus a non-virtual alphanumeric keyboard.)

At 202 (and referring as well to FIG. 3) this flowchart 200 provides for displaying via the touch-sensitive display 118 a plurality of predicted entries 302 as a function, at least in part, of at least some entries being entered by a user via the non-virtual alphanumeric keyboard 134. In this particular illustrative example the user entered the alphabetic character "T." Accordingly, this "T" appears on the touch-sensitive display 118 in an entered-text area 304 of the touch-sensitive display 118.

Also in this particular illustrative example the aforementioned predicted entries 302 (in this case, the complete words "the," "thanks," and "to") are presented in the lower portion of the touch-sensitive display 118. More particularly these predicted entries 302 appear along a side of the touch-sensitive display 118 that is most near to the non-virtual alphanumeric keyboard 134. So configured a user can conveniently and easily access the predicted entries 302 with one or more fingers without likely needing to rearrange their grasp of the device as suited to input entries via that keyboard 134. (It should be understood, however, that other arrangements in these regards are possible. For example, the predicted entries 302 can be as grouped or ungrouped as desired. As another example, when the keyboard comprises a virtual keyboard that appears on the touch-sensitive display 118, one or more of the predicted entries 302 can wholly or partially overlay one or more keys of the keyboard and/or can be disposed between keys of the keyboard. As yet another example, if desired, one or more of the predicted entries 302 can appear, in whole or in part, in or near the aforementioned entered-text area 304.)

Figure 4:
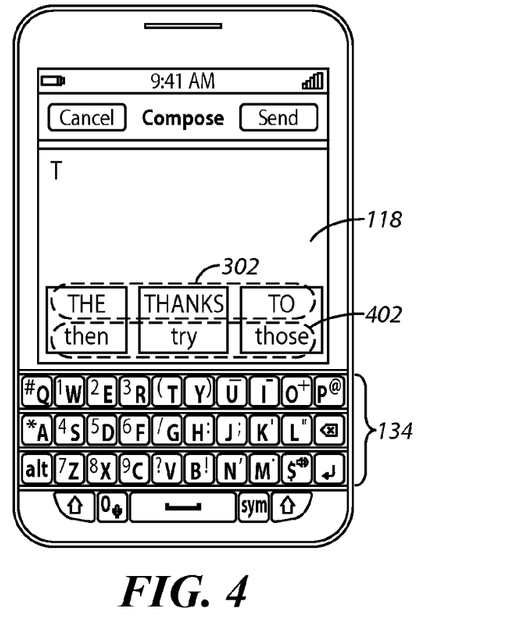
FIG. 4 is a schematic screen shot in accordance with the disclosure.

If desired, by one optional approach as illustrated at FIG. 4 this flowchart 200 at 202 will also accommodate displaying the aforementioned predicted entries 302 as a first group of presently immediately selectable predicted entries while also simultaneously displaying a second group 402 of predicted entries that are not presently immediately selectable via a detected touch. By one approach, the predicted entries that comprise this second group 402 can be displayed using a smaller-size font than is used to display the first group of predicted entries 302. These teachings will also accommodate visually differentiating these groups of predicted entries in other ways if desired. Examples include but are not limited to using different fonts, different font colors, different background colors/patterns, and so forth. In this illustrative example there are three such predicted entries that are not presently immediately selectable via a detected touch, these being the complete words "then," "try," and "those."

In any event, referring again to the example shown in FIG. 3 any of the plurality of predicted entries 302 are presently immediately selectable by a detected touch on the touch-sensitive display 118. For example, and referring to FIG. 5, by one approach the user could select the predicted entry "thanks" by tapping once on the displayed word "thanks." These teachings will readily accommodate any of a variety of touches as desired. (In FIG. 5 this touch is generically represented by a circle 502 rendered using a dashed line.)

Figure 5:
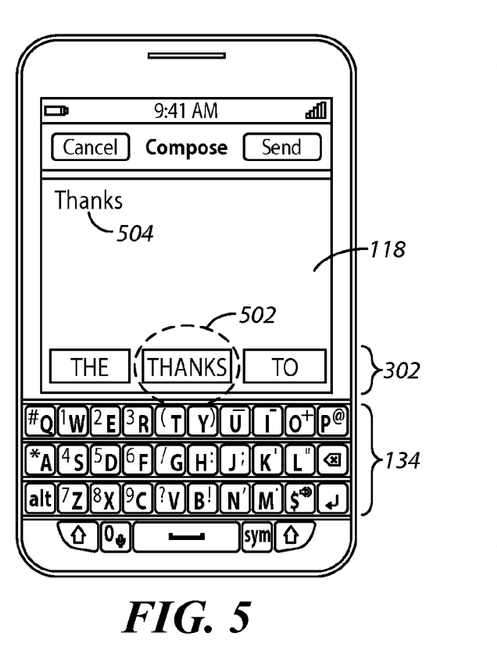
FIG. 5 is a schematic screen shot in accordance with the disclosure.

Referring as well to FIG. 2 the flowchart 200 provides for detecting that touch 502 (denoted in FIG. 2 as a "selection touch") at 204 and responding by using that touch 502 to identify (at 206) a first one of the predicted entries (in this example, the word "thanks") and selecting (at 208) that predicted entry. As shown in FIG. 5, by one approach this selecting can include displaying the predicted entry (at 504) as entered text.

In this particular example the predicted entries 302 are located on the touch-sensitive display 118 next to and just above the non-virtual alphanumeric keyboard 134. Accordingly it will be understood that the user has easy and convenient access to the displayed predicted entries 302 in a way that intuitively and ergonomically merges the functionality and usability of these two very-different user-input modalities.

The present teachings are highly flexible in practice and will readily accommodate a wide variety of alterations and additions. As one example in these regards, and by one optional approach, when the touch-sensitive display 118 provides both a first group of presently immediately selectable predicted entries 302 as well as a second group of non-presently immediately selectable predicted entries 402 as illustrated above in FIG. 4, these teachings will accommodate permitting the user to switch that availability status for those groups.

Figure 6:
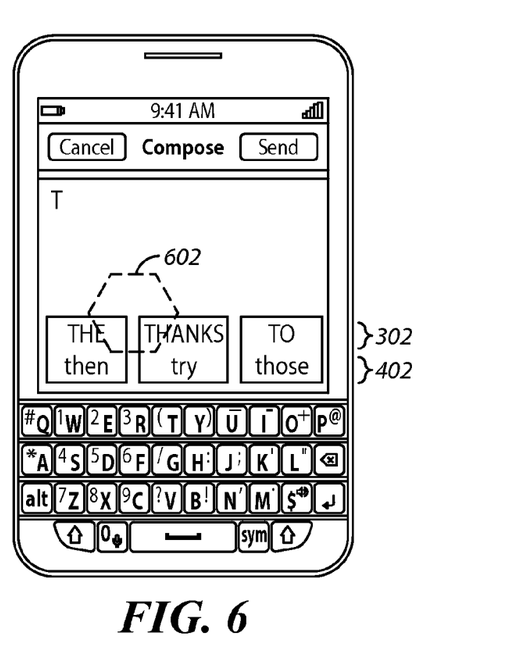
FIG. 6 is a schematic screen shot in accordance with the disclosure.

By way of illustration, and referring to FIG. 2 and FIG. 6, the flowchart 200 can optionally provide for detecting (at 210) a switch touch (generically represented in FIG. 6 by a hexagon 602 rendered with a dashed line and that will typically be different from the above-described selection touch 502). For example, this switch touch 602 might comprise an upward swipe or a downward swipe that includes, at least in part, one or more of the predicted entries 302 and 402. Other possibilities for the specific nature of the switch touch 602 of course exist and can be accommodated by this flowchart 200.

Figure 7:
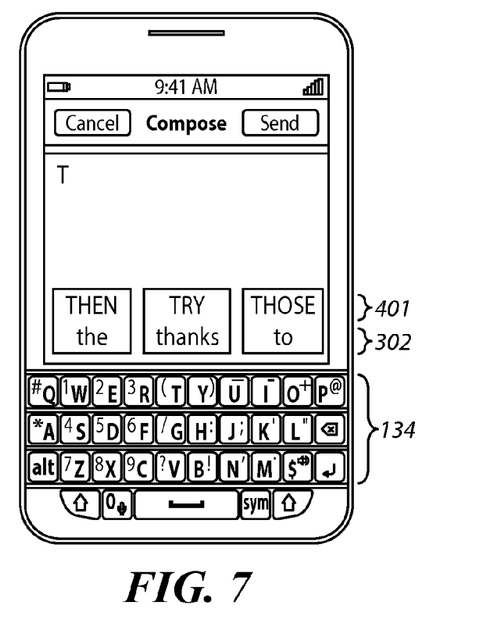
FIG. 7 is a schematic screen shot in accordance with the disclosure.

In response to detecting this switch touch 602 the flowchart 200 can provide for causing (at 212) the second group of predicted entries 402 as displayed via the touch-sensitive display 118 to now be switched with the first group of predicted entries 302 and hence now presently immediately selectable via a detected touch. Accordingly, the first group of predicted entries 302 as displayed via the touch-sensitive display 118 are now not presently immediately selectable via a detected touch. By one approach, and as shown in FIG. 7, this change in selectability status can be signaled and represented by switching the respective positions of the first and second groups of predicted entries 302 and 402. Other approaches can serve as well in these regards, however, in lieu of the foregoing or in combination therewith. For example, presently immediately selectable predicted entries can be colored green while non-presently immediately selectable predicted entries can be colored a different color, such as red.

So configured, a user can have ready and convenient access to an increased number of predicted entries notwithstanding the use of only a small portion of the available display space to present those entries.

It is possible that none of the displayed predicted entries (including both presently immediately selectable predicted entries as well as predicted entries that are not presently immediately selectable) match the user's intended entry. As a simple example in these regards, and referring again to FIG. 3, none of the predicted entries 302 "the," "thanks," or "to" may properly complete the entry "T" in the opinion of the user.

Figure 8:
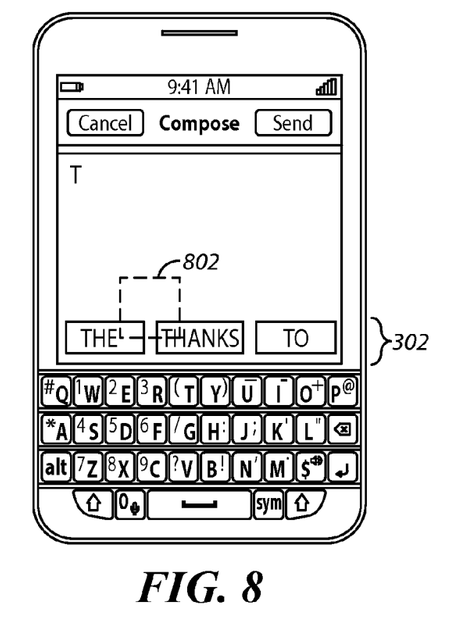
FIG. 8 is a schematic screen shot in accordance with the disclosure.

Accordingly, if desired, this flowchart 200 will optionally accommodate (at 214) detecting an "additional touch" 802 (generically illustrated in FIG. 8 as a square rendered with a dashed line) that is different, in this example, from either the selection touch 502 or the switch touch 602 described above. By way of example and without intending any limitations in these regards, this additional touch 802 could comprise an upward swipe that includes (or that passes between) one or more of the displayed predicted entries 302.

Figure 9:
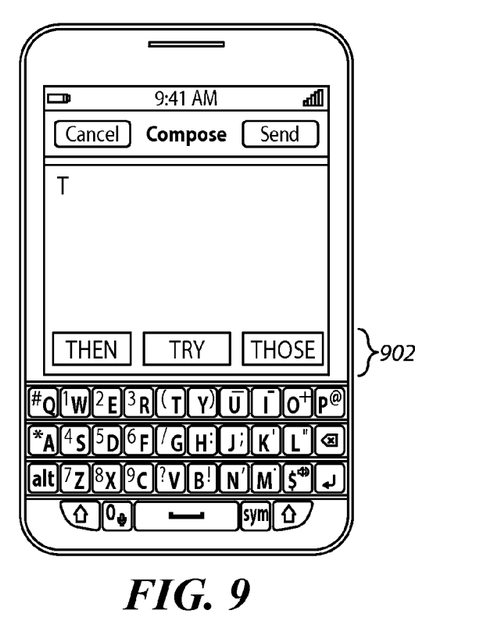
FIG. 9 is a schematic screen shot in accordance with the disclosure.

FIG. 2 (at 216) and FIG. 9 illustrate that the flowchart 200 can provide for responding to detection of that additional touch 802 by changing the display of predicted entries to provide a display of additional predicted entries 902 (in this example, the complete words "then," "try," and "those"). This process permits the user to select and use one of these newly-displayed predicted entries 902 by asserting the aforementioned selection touch 502. Also, when simultaneously displaying both immediately selectable predicted entries as well as predicted entries that are not presently immediately selectable these teachings will accommodate, in response to detecting the additional touch 802, changing the display of both immediately selectable and non-immediately selectable predicted entries to present new predicted entries of both categories.

It is of course possible that a user will effect one of the foregoing actions/instructions (either intentionally or through inadvertence) and wish to undo the completed action. For example, and referring again back to FIG. 3, a user may select the predicted entry "thanks" per the foregoing and decide that they would prefer not to proceed with that word.

Figure 10:
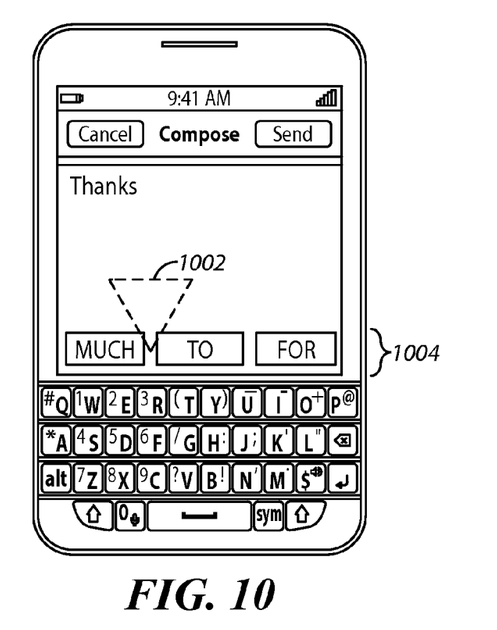
FIG. 10 is a schematic screen shot in accordance with the disclosure.

Referring to FIG. 2 (at 218) and FIG. 10, this flowchart will optionally accommodate detecting an undo touch 1002 (generically represented in FIG. 10 as a triangle rendered by a dashed line) and responding (at 220) by undoing the just-previous predicted entry action (in this case, the selection of the word "thanks" as entered text accompanied by a presentation of a next round of predicted choices 1004). By way of example and without intending any limitations in these regards, this undo touch 1002 (which can be different than any of the selection touch 502, switch touch 602, and additional touch 802 discussed above) might comprise a sideways swipe. In this illustrative example this undo action can cause the previous predicted entry action to be undone and for the display to return to the example shown in FIG. 3.

When providing an undo action as described above, if desired these teachings will also optionally accommodate detecting a redo touch 1002 to which the process responds by redoing a just-previous undo action. This redo touch can be different than any of the aforementioned touches as desired.

So configured, such a process can provide a variety of options and choices for a user as regards viewing, selecting, and undoing actions pertaining to predicted entries. Those skilled in the art will recognize and appreciate that these teachings are highly flexible in practice and will accommodate a wide range of further changes and alterations.

Figure 11:
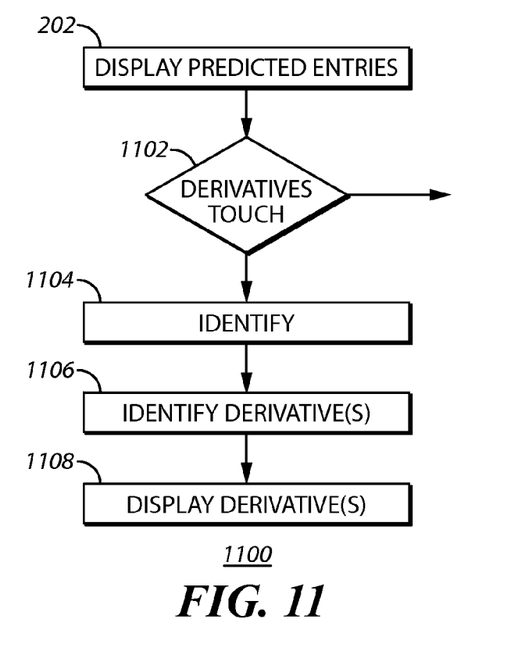
FIG. 11 is a flowchart in accordance with the disclosure.

FIG. 11 presents a flowchart 1100 that provides a further example in such regards. This process again presumes (at 202) the display of a plurality of predicted entries that are provided as a function, at least in part, of entries entered via a keyboard (as illustrated by way of example in FIG. 3). For the sake of an illustrative example, however, here it will be presumed that the keyboard comprises a virtual keyboard that appears on the touch-sensitive display 118. Again, those skilled in the art will recognize that these teachings will accommodate any combination of virtual and non-virtual keyboard with a touch-sensitive display.

Figure 12:
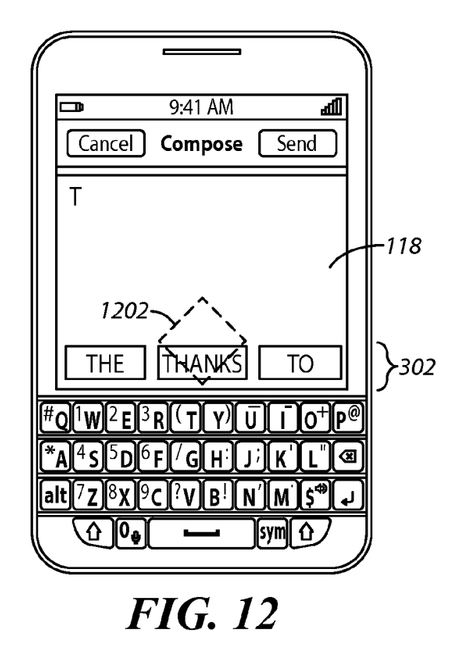
FIG. 12 is a schematic screen shot in accordance with the disclosure.

Referring to FIG. 11 and FIG. 12, the flowchart 1100 provides (at 1102) for detecting a "derivatives touch" 1202 (as generically represented in FIG. 12 by a diamond rendered using a dashed line). Generally speaking this derivatives touch 1202 is likely different from any of the earlier-described touches in order to avoid ambiguity when otherwise employing all of the earlier-described touches. That said, this derivatives touch 1202 (which might comprise, for example, a double-tap or a diagonal swipe) is at a location associated with an area of the touch-sensitive display 118 where a particular one of the predicted entries 302 is displayed. In this example the derivatives touch 1202 is so associated with the predicted entry "thanks." Accordingly, at least for most application settings this derivatives touch 1202 will not include locations of the touch-sensitive display 118 that are associated with one or more additional predicted entries in order to avoid ambiguity. So configured, at 1104 a given one of the predicted entries 302 is identified by identifying the particular predicted entry 302 that is so associated with the derivatives touch 1202.

At 1106 the flowchart 1100 provides for using that identified entry as a root to identify at least one further predicted entry. Accordingly, by one approach, this activity can comprise identifying one or more derivatives of the identified predicted entry.

By one approach identifying these derivatives can comprise, for example, identifying one or more inflections as correspond to the identified predicted entry. Grammatically speaking, inflection refers to modifying a word to express different grammatical categories such as tense, grammatical mood, grammatical voice, aspect, person, number, gender, and case. Conjugation, for example, refers to the inflection of verbs while declension refers to the inflection of nouns, adjectives, and pronouns. An inflection often expresses one or more grammatical categories by employing an explicitly-stated prefix, suffix, or infix, or another internal modification such as a vowel change.

By another approach identifying these derivatives can comprise, at least in part, leveraging syntactic categories. The traditional parts of speech (such as nouns, verbs, prepositions, and so forth) are examples of syntactic categories. A derivational suffix, for example, can often apply to words of one syntactic category and change them into words of another syntactic category. By way of illustration the English derivational suffix "ly" changes adjectives into adverbs (for example, the adjective "slow" becomes the adverb "slowly").

By yet another approach identifying these derivatives can comprise employing an affix. An affix is a morpheme that, when attached to a word stem, forms a new word. Affixation is therefore a linguistic process whereby different words are formed by adding morphemes (affixes) at the beginning (prefixation), the middle (infixation), or the end (suffixation) of root words. An affix may or may not be separated from its stem by a hyphen.

And as yet another approach, identifying these derivatives can comprise, at least in part, specifically using gender-based differences to identify words having a same meaning as the root word but expressed using a different sense of gender.

Those skilled in the art will understand and recognize that the forgoing examples of derivatives can overlap to some extent with one another. It will also be understood that more than one such approach (and indeed, other approaches as well) can serve in a given application setting to form, for example, a pool of candidate derivatives.

Figure 13:
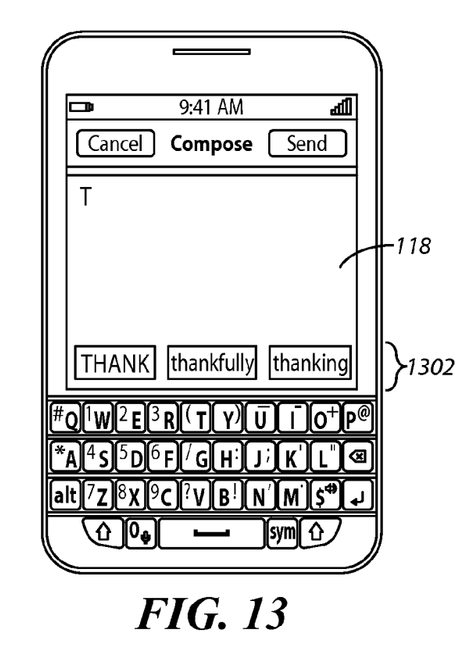
FIG. 13 is a schematic screen shot in accordance with the disclosure.

Referring to FIG. 11 and FIG. 13, at 1108 at least one of the identified derivatives (and in this illustrated example a group of such derivatives 1302) are displayed on the touch-sensitive display 118. In this particular example these derivatives 1302 are displayed in substitution for the previously-displayed predicted entries 302. These teachings will accommodate other approaches in these regards, however. For example, the derivatives 1302 can be simultaneously presented along with the previously-displayed predicted entries 302 and/or just the root word that the user selected per the above description.

In this particular illustrative example the user selected the predicted entry "thanks" as the root and the derivatives "thank," "thankfully," and "thanking" are identified and displayed as a corresponding result.

By one approach one or more of the predictive entry actions can now serve to permit the user to select a particular displayed derivative for use as selected text and/or to permit the user to replace the displayed derivatives with a display of additional, different derivatives. Also, these teachings will ready accommodate applying the process shown in FIG. 11 to permit the user to select one of the displayed derivatives as a new root and to responsively identify and display a new set of derivatives that use that new root. For example, referring to FIG. 13, a user could treat the displayed derivative "thankfully" as a new selected root and a new corresponding derivative "thankful" could be responsively identified and displayed.

It will be appreciated that a great variety of derivatives can be quickly developed and reviewed with only a very few touches. Accordingly, a user can very quickly and efficiently develop messages employing a rich vocabulary and grammatical depth.

The present disclosure may be embodied in other specific forms without departing from its essential characteristics. The described examples are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
a touch-sensitive display;
a non-virtual alphanumeric keyboard;
a processor operably coupled to the touch-sensitive display and the non-virtual alphanumeric keyboard and configured to, in conjunction with entries being entered via the non-virtual alphanumeric keyboard:
display via the touch-sensitive display a plurality of predicted entries as a function, at least in part, of at least some of the entries being entered via the non-virtual alphanumeric keyboard, wherein a first group of the plurality of predicted entries as displayed via the touch-sensitive display are presently immediately selectable via a detected touch and a second group of the plurality of predicted entries as displayed via the touch-sensitive display are not presently immediately selectable via a detected touch;
detect a first touch with the touch-sensitive display;
in response to detecting the first touch, causing the second group of the plurality of predicted entries as displayed via the touch-sensitive display to be presently immediately selectable via a detected touch and the first group of the plurality of predicted entries as displayed via the touch-sensitive display to not be presently immediately selectable via a detected touch;
detect a second touch with the touch-sensitive display following the first touch;
using the second touch to identify a first one of the plurality of predicted entries; and
select the first one of the plurality of predicted entries in response to the second touch.

2. The apparatus of claim 1, wherein the touch-sensitive display and the non-virtual alphanumeric keyboard are non-movably disposed in close proximity to one another and without another active user interface element externally disposed therebetween.

3. The apparatus of claim 1, wherein the processor is configured to display the plurality of predicted entries along a side of the touch-sensitive display that is most near to the non-virtual alphanumeric keyboard.

4. The apparatus of claim 1, wherein the processor is further configured to:
detect a third touch with the touch-sensitive display;
in response to detecting the third touch, displaying via the touch-sensitive display a different plurality of predicted entries.

5. The apparatus of claim 4, wherein the processor is configured to display via the touch-sensitive display the different plurality of predicted entries as a function, at least in part, of a detected correlation between the third touch and a particular one of the plurality of predicted entries.

6. The apparatus of claim 1 wherein the processor is further configured to:
detect another touch with the touch-sensitive display;
in response to detecting the touch, effect an undo action with respect to a previous predicted entry action.

7. A method comprising:
displaying via a touch-sensitive display a first plurality of predicted entries as a function, at least in part, of at least some characters entered via a non-virtual alphanumeric keyboard, wherein a first group of the first plurality of predicted entries as displayed via the touch-sensitive display are presently immediately selectable via a detected touch and a second group of the first plurality of predicted entries as displayed via the touch-sensitive display are not presently immediately selectable via a detected touch;

detecting a first touch with the touch-sensitive display;

in response to detecting the first touch, causing the second group of the first plurality of predicted entries as displayed via the touch-sensitive display to be presently immediately selectable via a detected touch and the first group of the first plurality of predicted entries as displayed via the touch-sensitive display to not be presently immediately selectable via a detected touch;

detect a second touch with the touch-sensitive display following the first touch;

using the second touch to identify a first one of the first plurality of predicted entries;

based upon detecting the second touch, terminating the displaying of the first plurality of predicted entries and displaying via the touch-sensitive display a second plurality of predicted entries, wherein the second plurality of predicted entries have a correlation with the first one of the first plurality of predicted entries;

detecting a third touch with the touch-sensitive display following the second touch;

using the third touch to identify a first one of the second plurality of predicted entries; and based upon the third touch, selecting the first one of the second plurality of predicted entries.

8. The method of claim 7, wherein displaying via the touch-sensitive display the first or the second plurality of predicted entries comprises displaying the plurality of predicted entries along a side of the touch-sensitive display that is most near to the non-virtual alphanumeric keyboard.

9. The method of claim 7, further comprising:

detecting another touch with the touch-sensitive display;

in response to detecting the another touch with the touch-sensitive display, effecting an undo action with respect to a previous predicted entry action.

10. The method according to claim 7 wherein the first one of the first plurality of predicted entries is a word and the second plurality of predicted entries include a derivative of the word.

11. The method according to claim 7 wherein the first one of the first plurality of predicted entries is a word and the second plurality of predicted entries includes an inflection of the word.

12. The method according to claim 7 wherein the first one of the first plurality of predicted entries is a word and the second plurality of predicted entries includes a leveraged syntactic category word of the word.

13. The method according to claim 7 wherein the first one of the first plurality of predicted entries is a word and the second plurality of predicted entries includes a gender based difference of the word.

14. A method comprising:

receiving text entries entered on an alphanumeric keyboard;

displaying via a touch-sensitive display a first plurality of predicted entries based upon the text entries and immediately selectable via a detected touch;

while displaying the first plurality of predicted entries, concurrently displaying via the touch-sensitive display a second plurality of predicted entries based upon the text entries and not immediately selectable via a detected touch;

detect a first touch with the touch-sensitive display;

in response to detecting the first touch, causing the second plurality of predicted entries to be immediately selectable via a detected touch and the first plurality of predicted entries to be not presently immediately selectable via a detected touch;

detect a second touch with the touch-sensitive display following the first touch identifying a first one of the second plurality of predicted entries; and selecting the first one of the second plurality of predicted entries based upon the second touch.

* * * * *